US006089454A

United States Patent [19]

Sadler

[11] Patent Number: 6,089,454

[45] Date of Patent: Jul. 18, 2000

[54] METHOD AND APPARATUS FOR CHECKING OUT ITEMS WHICH DO NOT HAVE A RECORD CORRESPONDING THERETO STORED IN A MASTER PRODUCT DATABASE

[75] Inventor: Robert F. Sadler, Cumming, Ga.

[73] Assignee: NCR Corporation, Dayton, Ohio

[21] Appl. No.: 09/208,156

[22] Filed: Dec. 9, 1998

[51] Int. Cl.[7] ...................... G06K 15/00

[52] U.S. Cl. .................. 235/383; 235/378; 235/375; 902/22; 902/40

[58] Field of Search .................. 235/383, 375, 235/378, 381, 385, 470, 487; 982/21, 22, 40

[56] References Cited

U.S. PATENT DOCUMENTS

| | | | |
|---|---|---|---|
| 4,800,493 | 1/1989 | Takagi | 235/378 X |
| 5,250,789 | 10/1993 | Johnson | 235/383 |
| 5,335,171 | 8/1994 | Fuyama | 235/378 X |
| 5,382,779 | 1/1995 | Gupta | 235/383 |
| 5,493,107 | 2/1996 | Gupta et al. | 235/383 |
| 5,952,642 | 9/1999 | Lutz | 235/383 |
| 5,970,470 | 10/1999 | Walker et al. | 750/14 |
| 6,032,128 | 2/2000 | Morrison et al. | 235/383 X |

*Primary Examiner*—Michael G Lee
*Attorney, Agent, or Firm*—Maginot, Addison & Moore

[57] ABSTRACT

A system and method of operating a retail checkout terminal includes the step of determining a first product code associated with a first item when a user enters the first item into the checkout terminal. The method also includes the step of determining if a master product database is devoid of first product information corresponding to the first item and generating a first no-record control signal in response thereto. Moreover, the method includes the step of detecting if the user manually enters the first product information corresponding to the first item in response to generation of the first no-record control signal and generating a first manually-entered control signal in response thereto. The method further includes the step of storing the first product information corresponding to the first item in a supplemental product database in response to generation of the first manually-entered control signal.

16 Claims, 5 Drawing Sheets

METHOD AND APPARATUS FOR CHECKING OUT ITEMS WHICH DO NOT HAVE A RECORD CORRESPONDING THERETO STORED IN A MASTER PRODUCT DATABASE

TECHNICAL FIELD OF THE INVENTION

The present invention relates generally to a retail checkout terminal, and more particularly to a method and apparatus for checking out items which do not have a record corresponding thereto stored in a master product database.

BACKGROUND OF THE INVENTION

In the retail industry, the largest expenditures are typically the cost of the goods sold followed closely by the cost of labor expended. With particular regard to the retail grocery or supermarket industry, the impetus to reduce labor costs has focused on reducing or eliminating the amount of time required to handle and/or process the items or goods to be purchased by a customer. To this end, there have been a number of retail checkout terminal concepts developed which attempt to reduce the amount of time required by a checkout clerk to checkout a customer's items for purchase. For example, assisted retail terminals (i.e. checkout terminals which are operated by a checkout clerk) have heretofore been designed which include integrated scanner and product scale assemblies which eliminate the need for the checkout clerk to carry produce or the like to a centralized weighing station in order to obtain the weight of the produce during a checkout procedure.

Moreover, there have been a number of self-service checkout terminal concepts developed which attempt to substantially eliminate the need for the checkout clerk. A self-service checkout terminal is a system which is operated by a customer without the aid of the checkout clerk. What is meant herein by the term "customer" is a person who enters the retailer's store, selects his or her items for purchase from the shopping area of the store, checks out his or items for purchase by use of a self-service checkout terminal, tenders payment for his or her items for purchase, and then exits the store subsequent to tendering payment. Hence, as used herein, a customer is distinguished from a checkout clerk or other employee of the retailer in that a customer enters the retailer's store for the sole purpose of purchasing items from the store.

Hence, it should be appreciated that in regard to operation of a self-service checkout terminal, the customer scans individual items for purchase across a scanner and then places the scanned items into a grocery bag, if desired. The customer then pays for his or her purchases either at the self-service checkout terminal if so equipped, or at a central payment area which is staffed by a store employee. Thus, a self-service checkout terminal permits a customer to select, itemize, and in some cases pay for his or her purchases without the assistance of the retailer's personnel.

However, during operation of a retail checkout terminal it is occasionally necessary for retail personnel, such as a customer service manager, to intervene in the checkout transaction. For example, an item may be scanned or otherwise entered into the retail checkout terminal which does not have a record associated therewith stored in a master product database. In particular, if the product identification code associated with an item is scanned or otherwise read from the item, the processing unit associated with the retail checkout terminal communicates with a network storage device in order to retrieve product information associated with the scanned item (e.g. description and price) from the master product database maintained on the network storage device. However, if product information associated with the scanned item is not included in the master product database, an error message is generated and intervention by store personnel is requested.

In the case of an assisted checkout terminal, such an error message may be as simple as displaying an error message on a display monitor which instructs the checkout clerk to manually enter the required product information (e.g. the price) associated with the item. For example, if the checkout clerk scans a magazine for entry into the retail terminal, the processing unit associated with the terminal attempts to retrieve product information associated with the magazine from the master product database. However, if product information associated with the magazine is not included in the master product database, an error message is displayed on the display monitor associated with the terminal which instructs the checkout clerk to manually enter the price of the magazine into the terminal. It should be appreciated that if the items for purchase of a subsequent customer also include the same magazine, the checkout clerk will again be required to manually enter the price of the magazine in the manner previously described.

Such intervention by store personnel is also occasionally necessary in the case of operation of a self-service checkout terminal. For example, if the customer scans an item for purchase that does not have product information associated therewith stored in the master product database, it is necessary for retail personnel, such as a customer service manager, to intervene in the customer's checkout transaction. This is true since the customer may have little or no training in the operation of the self-service checkout terminal and therefore may not be able to perform manual entry of the price of the item. Moreover, it is also known that some customers may have improper intentions when using a self-service checkout terminal. Such improper intentions may include the propensity to manually enter a dollar amount which is less than the actual price of the item.

Hence, in the case of a self-service checkout terminal, it has heretofore been necessary for the customer service manager to be paged or otherwise summoned to manually enter the price of any items included in the customer's items for purchase which do not have product information associated therewith included in the master product database. For example, if the customer scans a magazine for entry into the self-service checkout terminal, the processing unit associated with the terminal attempts to retrieve product information associated with the magazine from the master product database. However, if product information associated with the magazine is not included in the master product database, store personnel such as the customer service manager is paged or otherwise summoned to the self-service checkout terminal. Once the customer service manager arrives at the self-service checkout terminal, he or she manually enters the price of the magazine into the terminal. It should be appreciated that if the items for purchase of a subsequent customer also include the same magazine, the customer service manager will again be required to approach the self-service checkout terminal and thereafter manually enter the price of the magazine in the manner previously described.

Such intervention has a number of drawbacks associated therewith. For example, the retailer must always have a number of employees (e.g. a number of customer service managers) present during operation of the retail checkout terminals in order to intervene into checkout transactions (as needed) thereby increasing costs associated with the retailer's operation. Moreover, the requirement of such intervention may be inconvenient to the retailer's customers. Moreover, such a requirement reduces the throughput associated with the retail checkout terminals. In particular, if the customer is otherwise finished with his or her checkout transaction, but must wait for the customer service manager to approach the retail checkout terminal, the customer is undesirably forced to remain at the terminal thereby reducing the number of customers which may checkout their items for purchase via use of the terminal over a given period of time (i.e. reduces throughput though the terminal).

What is needed therefore is a retail checkout terminal which overcomes one or more of the above-mentioned drawbacks. What is particularly needed is a retail checkout terminal which reduces the number of occasions in which retail personnel must intervene in a customer's checkout transaction. What is also needed is a retail checkout terminal which reduces the number of occasions in which product information associated with an item must be manually entered.

SUMMARY OF THE INVENTION

In accordance with a first embodiment of the present invention, there is provided a method of operating a retail checkout terminal. The method includes the step of determining a first product code associated with a first item when a user enters the first item into the checkout terminal. The method also includes the step of determining if a master product database is devoid of first product information corresponding to the first item and generating a first no-record control signal in response thereto. Moreover, the method includes the step of detecting if the user manually enters the first product information corresponding to the first item in response to generation of the first no-record control signal and generating a first manually-entered control signal in response thereto. The method further includes the step of storing the first product information corresponding to the first item in a supplemental product database in response to generation of the first manually-entered control signal.

In accordance with a second embodiment of the present invention, there is provided a method of operating a retail checkout terminal. The method includes the step of creating a supplemental product database during a first checkout procedure. The supplemental product database has first product information corresponding to a first item for purchase entered by a first user during the first checkout procedure. The method also includes the step of determining a product code associated with a second item for purchase when a second user enters the second item into the checkout terminal during a second checkout procedure. Moreover, the method includes the step of determining if the supplemental product database includes second product information corresponding to the second item during the second checkout procedure and generating a record-found control signal in response thereto.

In accordance with a third embodiment of the present invention, there is provided a retail checkout terminal. The checkout terminal includes an input device for receiving a first product code associated with a first item when a user enters the first item into the checkout terminal. The checkout terminal also includes a processing unit electrically coupled to the input device. The checkout terminal also includes a memory device electrically coupled to the processing unit. The memory device has stored therein a plurality of instructions which, when executed by the processing unit, causes the processing unit to (i) determine if a master product database is devoid of first product information corresponding to the first item and generate a first no-record control signal in response thereto, (ii) detect if the user manually enters the first product information corresponding to the first item in response to generation of the first no-record control signal and generate a first manually-entered control signal in response thereto, and (iii) store the first product information corresponding to the first item in a supplemental product database in response to generation of the first manually-entered control signal.

It is therefore an object of the present invention to provide a new and useful self-service checkout terminal.

It is moreover an object of the present invention to provide an improved self-service checkout terminal.

It is a further object of the present invention to provide a new and useful method of operating a self-service checkout terminal.

It is also an object of the present invention to provide an improved method of operating a self-service checkout terminal.

It is yet another object of the present invention to provide a retail checkout terminal which reduces the number of occasions in which retail personnel must intervene in a customer's transaction.

It is also an object of the present invention to provide a retail checkout terminal which reduces the number of occasions in which product information associated with an item must be manually entered.

The above and other objects, features, and advantages of the present invention will become apparent from the following description and the attached drawings.

DETAILED DESCRIPTION OF THE INVENTION

Figure 1:
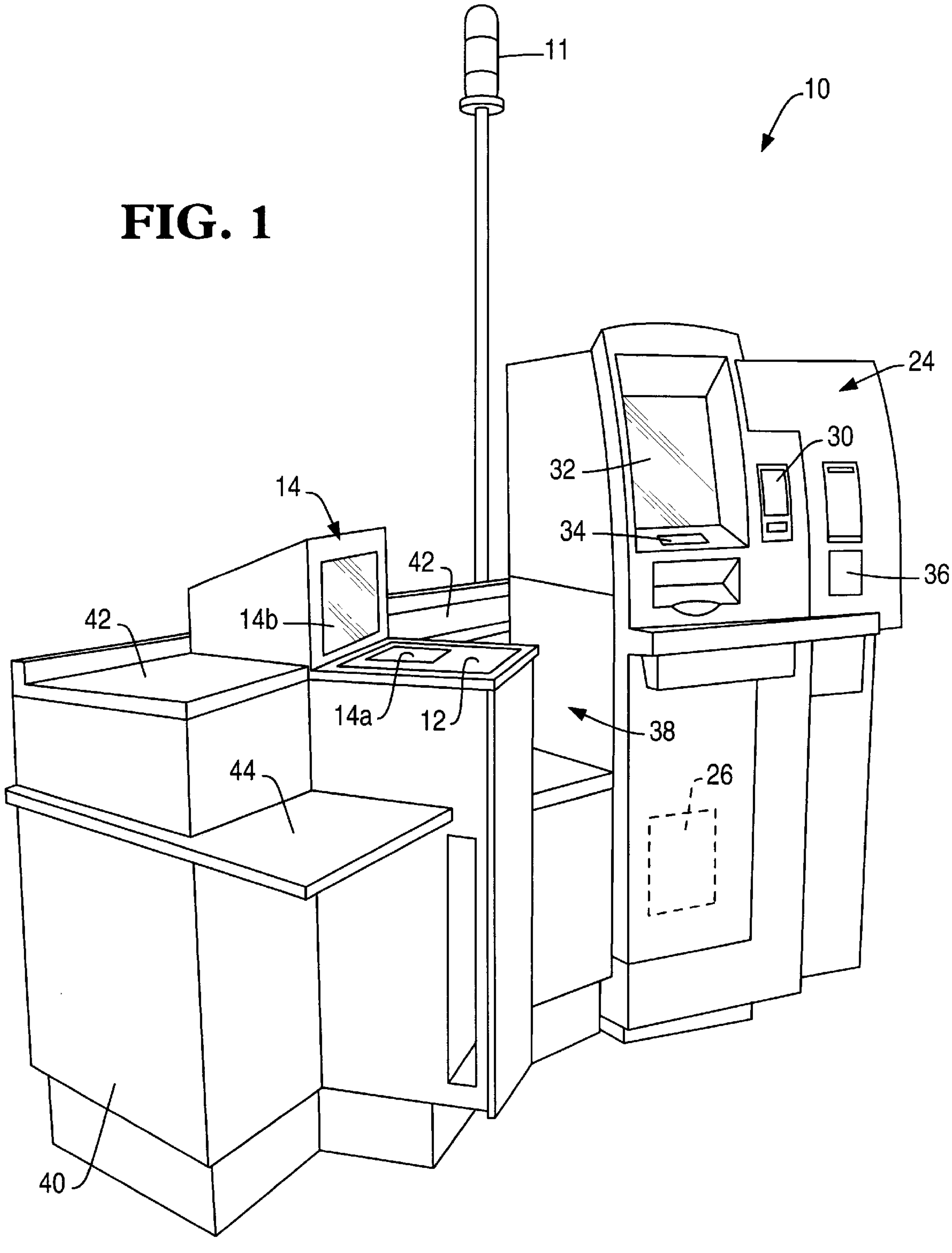
FIG. 1 is a perspective view of a self-service checkout terminal which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the appended claims.

Referring now to FIG. 1, there is shown a retail checkout terminal such as a self-service checkout terminal 10 for use in a retail business such as a grocery store. For purposes of the following discussion, the self-service checkout terminal 10 will be described in detail; however, it should be appreciated that an assisted checkout terminal (i.e. a retail checkout terminal which is operated by a retail clerk) may be configured in a similar manner. The self-service checkout terminal 10 includes a status light device 11, a product scale 12, a scanner 14, a card reader 30, a display monitor 32, a keypad 34, a printer 36, and a processing unit 26. The card reader 30, the display monitor 32, the keypad 34, and the printer 36 may be provided as separate components, or alternatively may preferably be provided as components of an automated teller machine (ATM) 24.

The self-service checkout terminal 10 also includes a bagwell 38 for accommodating one or more grocery bags (not shown), a base 40 having a counter 42 secured thereto, and a basket shelf 44. The counter 42 defines an arcuate surface as shown in FIG. 1. Such an arcuate surface allows the scanner 14 to be positioned relatively close or otherwise proximate the ATM 24 and hence the components associated therewith. Such a configuration facilitates a customer's use of the self-service checkout terminal 10. Moreover, the bagwell 38 is configured to allow two or more grocery bags to be accessed by the customer at any given time thereby allowing a customer to selectively load various item types into the grocery bags. For example, the customer may desire to use a first grocery bag for household chemical items such as soap or bleach, and a second grocery bag for edible items such as meat and produce.

The scanner 14 conventionally scans or reads a product identification code such as a Universal Product Code (UPC), industrial symbol(s), alphanumeric character(s), or other indicia associated with an item to be purchased. One scanner which may be used in the present invention is a model number 7875 bi-optic scanner which is commercially available from NCR Corporation of Dayton, Ohio.

The scanner 14 includes a first scanning window 14*a* and a second scanning window 14*b*. The first scanning window 14*a* is disposed in a substantially horizontal manner, whereas the second scanning window 14*b* is disposed in a substantially vertical manner, as shown in FIG. 1. The product scale 12 is integrated with the scanner 14. More specifically, the product scale 12 is disposed substantially parallel to the scanning window 14*a* thereby enveloping the scanning window 14*a*. If an item such as produce is placed upon the product scale 12 or the first scanning window 14*a*, the product scale 12 may be used to determine the weight of the item.

The scanner 14 also includes a light source (not shown) such as a laser, a rotating mirror (not shown) driven by a motor (not shown), and a mirror array (not shown). In operation, a laser beam reflects off the rotating mirror and mirror array to produce a pattern of scanning light beams. As the product identification code on an item is passed over the scanner 14, the scanning light beams scatter off the code and are returned to the scanner 14 where they are collected and detected. The reflected light is then analyzed electronically in order to determine whether the reflected light contains a valid product identification code pattern. If a valid code pattern is present, the product identification code may then be utilized to retrieve product information associated with the item (e.g. the price of the item) in the manner described below.

The display monitor 32 displays instructions which serve to guide a customer through a checkout procedure. For example, an instruction is displayed on the display monitor 32 which instructs the customer to enter an item into the self-service checkout terminal 10 by either passing the item over the scanner 14, or placing the item on the product scale 12 in order to obtain the weight of the item. The display monitor 32 is preferably a known touch screen monitor which can generate data signals when certain areas of the screen are touched by a customer.

The status light device 11 is provided in order to notify store personnel, such as a customer service manager, that intervention into the customer's transaction is needed. In particular, the status light device 11 may display a first colored light in order to notify store personnel that intervention is needed prior to the end of the customer's transaction. Alternatively, the status light device 11 may display a second colored light in order to notify store personnel that intervention is needed immediately.

Figure 2:
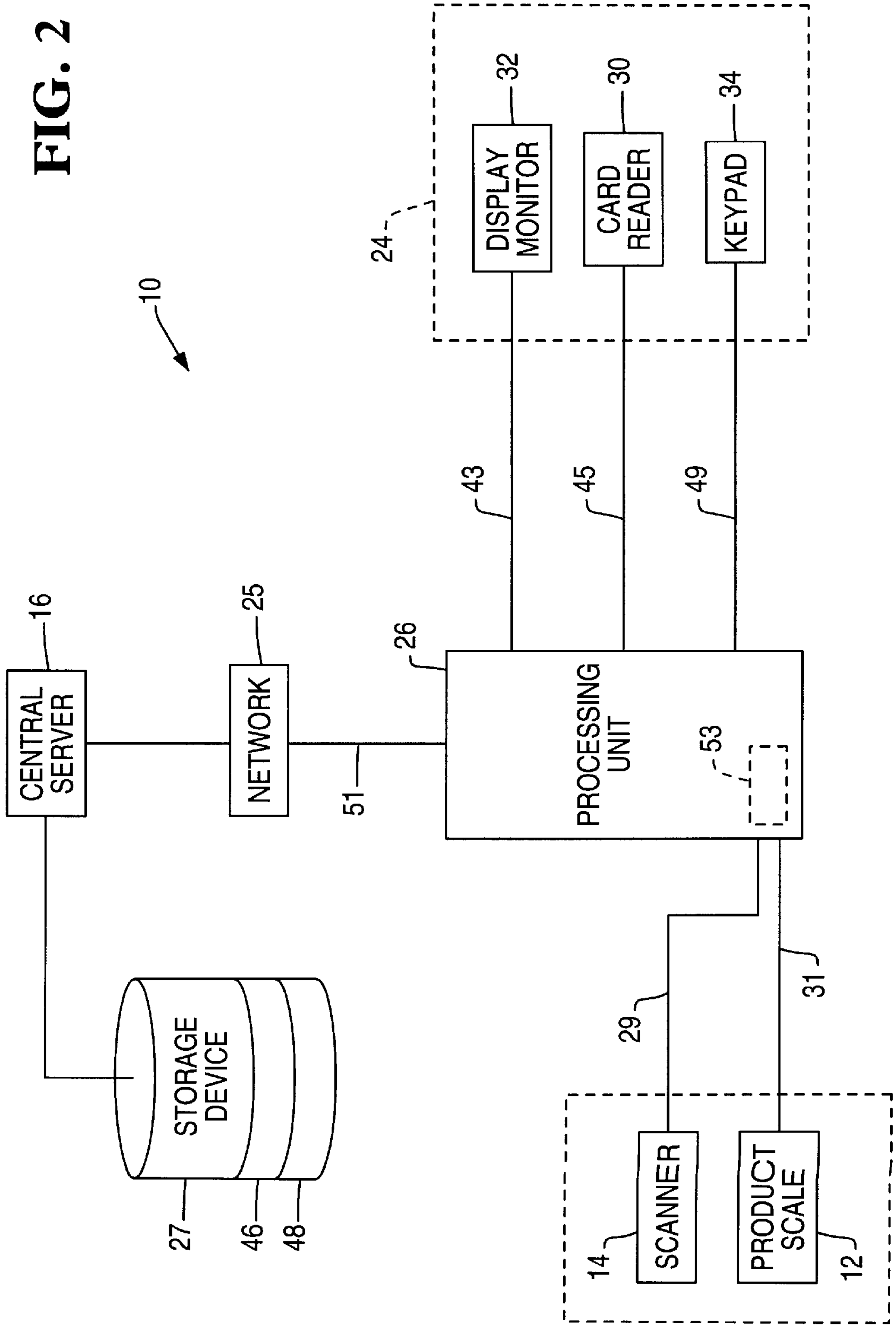
FIG. 2 is a simplified block diagram of the self-service checkout terminal of FIG. 1.

Referring now to FIG. 2, there is shown a simplified block diagram of the self-service checkout terminal 10. The processing unit 26 is electrically coupled to the product scale 12, the scanner 14, the card reader 30, the display monitor 32, and the keypad 34. The processing unit 26 is also electrically coupled to a network 25, and a central server 16.

The processing unit 26 monitors output signals generated by the scanner 14 via a communication line 29. In particular, when the customer scans an item which includes a product identification code across the scanning windows 14*a*, 14*b*, an output signal indicative of the product identification code is generated on the communication line 29.

The processing unit 26 is coupled to the product scale 12 via a data communication line 31. In particular, when a customer places an item on the product scale 12, the product scale 12 generates an output signal on the data communication line 31 indicative of the weight of the item.

The processing unit 26 communicates with the display monitor 32 through a data communication line 43. The processing unit 26 generates output signals on the data communication line 43 which cause various instructional messages to be displayed on the display monitor 32. As alluded to above, the display monitor 32 may include known touch screen technology which can generate output signals when the customer touches a particular area of the display screen associated with the display monitor 32. The signals generated by the display monitor 32 are transmitted to the processing unit 26 via the data communication line 43. It should be appreciated that the various instructional messages may also be communicated via other devices in addition to or in lieu of the display monitor 32. For example, instructional messages may be generated with a voice generating device (not shown) or an audible tone generating device (not shown).

The keypad 34 is coupled to the processing unit 26 through a data communication line 49. The keypad 34 may include one or more of a known keypad or a touch pad. It should be appreciated that the scanner 14, the display monitor 32, and the keypad 34 define input devices which may be utilized by a customer to input product identification codes associated with an item. For example, the customer may enter the product identification code associated with an item by passing or otherwise moving the item over the scanner 14 with the bar code associated with the item facing one of the scanning windows 14*a*, 14*b* thereby allowing the scanner 14 to read or otherwise capture the product identification code. Moreover, the customer may manually enter the product identification code associated with an item by use of the touch screen associated with the display monitor 32 or the keys associated with the keypad 34. It should be appreciated that numerous other types of input devices may also be used to allow the customer to enter the product identification code associated with an item during operation of the self-service checkout terminal 10.

Moreover, the card reader 30 is coupled to the processing unit through a data communication line 45. The card reader 30 may include a known credit, debit, loyalty, and/or smart card reader which is capable of reading information stored on the customer's card.

The processing unit 26 includes network interface circuitry (not shown) which conventionally permits the self-service checkout terminal 10 to communicate with the network 25 such as a LAN or WAN through a wired connection 51. As shall be discussed further below, the processing unit 26 communicates with the network 25 during the checkout procedure in order to obtain information, such as pricing information, associated with an item being scanned or otherwise entered, and also to verify customer credit approval when appropriate. The network interface circuitry associated with the self-service checkout terminal 10 may include a known Ethernet expansion card, and the wired connection 51 may include a known twisted-pair communication line. Alternatively, the network interface circuitry may support wireless communications with the network 25.

The self-service checkout terminal 10 communicates with the central server 16 via the network 25. The central server 16 has a mass storage device 27 associated therewith which maintains a number of databases associated with operation of the self-service checkout terminal 10. For example, the mass storage device 27 of the central server 16 maintains a master product database 48 which includes product information associated with each item sold by the retailer. What is meant herein by the term "product information" is any information or data associated with an individual item which is utilized to complete a checkout procedure. For example, the product information associated with a given item may include the price of the item. Moreover, the product information associated with a given item may include a description of the item. Yet further, the product information associated with a given item may include a department code corresponding to the retailer's department (e.g. the meat, floral, or produce department) from which the customer selected the item. It should be appreciated that although numerous different types of product information may be utilized by a given retailer, it is typically necessary for the product information associated with an item to include, at a minimum, the price of the item.

As alluded to above, the contents of the master product database 48 are utilized to complete a customer's checkout procedure. For example, if a customer scans or otherwise enters an item for purchase into the self-service checkout terminal 10, the processing unit 26 communicates with the central server 16 in order to retrieve product information associated with the item (e.g. the price and description the item) from the master product database 48. Such product information is then communicated to the self-service checkout terminal 10 for purposes of completing the customer's checkout procedure by performing such functions as calculating the total of the customer's items for purchase and printing a receipt.

In order to utilize such retrieved product information, along with manually entered product information (as discussed below in greater detail), the processing unit 26 has a memory device 53 associated therewith. The memory device 53 is provided to locally maintain a number of tables and databases associated with operation of the self-service checkout terminal 10. For example, the memory device 53 maintains an electronic transaction table which includes a record of the product information associated with each item that is scanned, weighed, or otherwise entered during the customer's checkout procedure. For example, if the customer scans a can of soup, both the product identification code read from the can of soup and the product information associated therewith (e.g. the price and description of the soup) are recorded in the transaction table in the memory device 53. Similarly, if the customer weighs a watermelon with the product scale 12 and then enters a product lookup code associated with watermelon via the keypad 34, product information associated with the watermelon is recorded in the transaction table in the memory device 53. Moreover, if a customer manually enters the product identification code associated with a large bag of dog food via the keypad 34 or the touch screen associated with the display monitor 32, the processing unit 26 communicates with the central server 16 to retrieve the product information associated the dog food and thereafter records both the product identification code and the retrieved product information associated with dog food in the transaction table.

It should therefore be appreciated that the sum of each of the items recorded in the transaction table (1) minus any reductions (e.g. coupons), and (2) plus any applicable taxes is the amount that the customer pays for his or her checkout procedure. Moreover, data stored in the transaction table is printed out on the printer 36 (see FIG. 1) thereby generating a receipt for the customer at the end of his or her checkout procedure. What is meant herein by the term "checkout procedure" is a terminal session by a given user in which the user initializes or otherwise "logs on" the self-service checkout terminal 10, enters his or her items for purchase, and thereafter deactivates or otherwise "logs off" the self-service checkout terminal 10. It should be appreciated that in the case of where the self-service checkout terminal is equipped with payment devices which allow the user to tender payment at the self-service checkout terminal (e.g. the card reader 30 or a cash acceptor), a checkout procedure would also include tendering of payment prior to deactivation or "logging off" of the self-service checkout terminal.

For example, a first customer completes a first checkout procedure when the first customer initializes the self-service checkout terminal 10, enters his or her items for purchase into the terminal 10, tenders payment for his or her items for purchase by inserting a debit or credit card into the card reader 30, and thereafter deactivates the terminal 10. Thereafter, a second customer may complete a subsequent checkout procedure by initializing the self-service checkout terminal 10, entering his or her items for purchase into the terminal 10, tendering payment for his or her items for purchase by inserting his or her debit or credit card into the card reader 30, and thereafter deactivating the terminal 10.

During a given checkout procedure, a customer may enter an item which does not have product information corresponding thereto stored in the master product database 48. For example, the customer may scan an item, such as a magazine, with the scanner 14 in order to enter the product identification code associated with the magazine. Thereafter, the processing unit 26 queries the master product database 48 in order to obtain product information associated with the magazine. However, the master product database 48 may be devoid of product information associated with the magazine. In other words, the master product database 48 may not include a record containing product information associated with the magazine stored therein. It should be appreciated that if the master product database 48 is devoid of product information associated with an item, a record of the item is not immediately added to the transaction table in the memory device 53. This is true since it is typically necessary to have the price of the item prior to recording the item in the transaction table.

In order to facilitate operation of the self-service checkout terminal 10 in the event the master product database 48 is devoid of product information associated with an item entered by the customer, the mass storage device 27 of the central server 16 also maintains a supplemental product database 46. The supplemental product database 46 includes product information associated with items which do not have product information corresponding thereto stored in the master product database 48. In particular, if a customer scans or otherwise enters the product identification code associated with an item, such as a magazine, that does not have product information associated therewith stored in the master product database 48, such product information must be manually entered into the self-service checkout terminal 10. For example, if product information associated with the scanned item must be manually entered, the processing unit 26 may cause a lamp associated with the status light device 11 to be illuminated thereby summoning retail personnel such as a customer service manager. The customer service manager then approaches the self-service checkout terminal 10 to assist the customer by determining the required product information (e.g. the price of the item) and thereafter manually entering such required product information into the self-service checkout terminal 10 via use of the keypad 34 or the touch screen associated with the display monitor 32.

Once the customer service manager has manually entered the required product information (e.g. the price of the item) via use of the keypad 34 or the touch screen associated with the display monitor 32, the processing unit 26 communicates with the central server 16 in order to cause the supplemental product database 46 to be updated. In particular, the processing unit 26 communicates with the central server 16 in order to cause a record to be added to the supplemental product database 46 which includes the product identification code associated with the item along with the manually entered product information (e.g. the price of the item). Thereafter, if the customer scans or otherwise enters the product identification code associated with a subsequent item, the processing unit 26 initially queries the master product database 48 for product information associated with the item. If the master product database 48 is devoid of such product information, the processing unit 26 queries the supplemental product database 46 in order to retrieve the desired product information. If product information associated with the scanned item is stored in the supplemental product database 46, the processing unit 26 records the entered product identification code and the product information associated with the item (i.e. the product information that was retrieved from the supplemental database 46) in the transaction table in the memory device 53. However, if both the master product database 48 and the supplemental product database 46 are devoid of product information associated with the scanned item, the customer service manager is summoned in order to manually enter the required product information associated with the item (e.g. the price of the item) in the manner previously discussed. Thereafter, a record containing the scanned product identification code and the manually entered product information is added to the supplemental product database 46 in the manner previously described.

It should be appreciated that use of the supplemental product database reduces the number of occasions in which product information associated with an item must be manually entered. In particular, as described above, if a customer scans or otherwise enters the product identification code associated with an item, such as a magazine, that does not have product information associated therewith stored in the master product database 48, such product information must be manually entered into the self-service checkout terminal 10. Once the required product information is manually entered, a record containing the product identification code and the manually entered product information is added to the supplemental product database 46 in the manner previously described. Thereafter, during a subsequent customer's checkout procedure, the contents of the supplemental product database 46 may be utilized to prevent the subsequent customer from having to manually enter product information associated with a number of items. For example, if the subsequent customer scans or otherwise enters the product identification code associated with an item, such as the same magazine entered by one of the previous customers, the processing unit 26 initially queries the master product database 48 for product information associated with the item. If the master product database 48 is devoid of such product information, the processing unit 26 queries the supplemental product database 46 in order to retrieve the desired product information. If product information associated with the scanned item is stored in the supplemental product database 46, the processing unit 26 records the entered product identification code and the product information associated with the item (i.e. the product information that was retrieved from the supplemental database 46) in the transaction table in the memory device 53 thereby preventing the customer service manager from having to manually enter the product information associated with the item.

The contents of the supplemental product database 46 may be retained for any predetermined period of time. For example, records in the supplemental product database 46 may be maintained for one week and thereafter cleared from the database 46. Alternatively, such records may be maintained indefinitely until cleared by retail personnel.

Moreover, it should be further appreciated that by storing the supplemental product database 46 on the mass storage device 27 associated with the central server 16, the contents of the supplemental product database 46 may be utilized by each of the retail checkout terminals that communicate with the central server 16. For example, if a given retail operation utilizes fifteen self-service checkout terminals, records added to the supplemental product database 46 may be utilized to facilitate operation of all fifteen checkout terminals, not simply the terminal which caused the record to be entered.

Moreover, the supplemental product database 46 may be maintained locally (i.e. at the retailer's store), regionally (i.e. within a group of stores in the same geographic region), or globally (i.e. at the retailer's headquarters so as to be accessible at any of the retailer's stores). Hence, access to the supplemental product database 46 may be configured to fit the requirements of a given retailer.

Yet further, the retailer may configure the self-service checkout terminal 10 in a number of different manners in order to control the addition of records to the supplemental product database 46. For example, the retailer may allow records to be added to the supplemental product database 46 only if the product information contained in the record (e.g. the price of the item) is manually entered by retail personnel such as the customer service manager (as described above). In such a configuration, the processing unit 26 would update the supplemental product database 46 only in those situations in which the customer service manager "logged on" to the terminal 10 with an appropriate password or the like.

Moreover, the retailer may configure the self-service checkout terminal 10 to allow the customer to manually enter the product information associated with an item which does not have corresponding product information stored in the master product database 48 himself or herself without the aid of the customer service manager. However, in such a configuration, the retailer may choose to approve the manually entered product information that is entered by the customer prior to adding a record corresponding thereto to the supplemental product database 46. In particular, when the customer manually enters product information associated with an item, a message containing such manually entered product information is sent via the network 25 to retail personnel located in the store office or the like. Retail personnel may then approve or deny the addition of a record containing the manually entered product information to the supplemental product database 46.

It should be appreciated that in the case of an assisted retail terminal, the checkout clerk may manually enter product information associated with items which do not have corresponding product information stored in the master product database 48. The retailer may configure the retail checkout terminal to add a record containing such product information manually entered by the checkout clerk to the supplemental product database 46 with or without additional approval. In particular, the retailer may configure the retail checkout terminal 10 to add a record containing the manually entered product information to the supplemental product database 46 upon entry thereof by the checkout clerk without additional approval from the customer service manager. Alternatively, the retailer may configure the retail checkout terminal 10 to add a record containing the manually entered product information to the supplemental product database 46 only upon approval from the customer service manager or the like (i.e. action by the checkout clerk alone may not cause records to be added to the supplemental product database 46).

Figure 3:
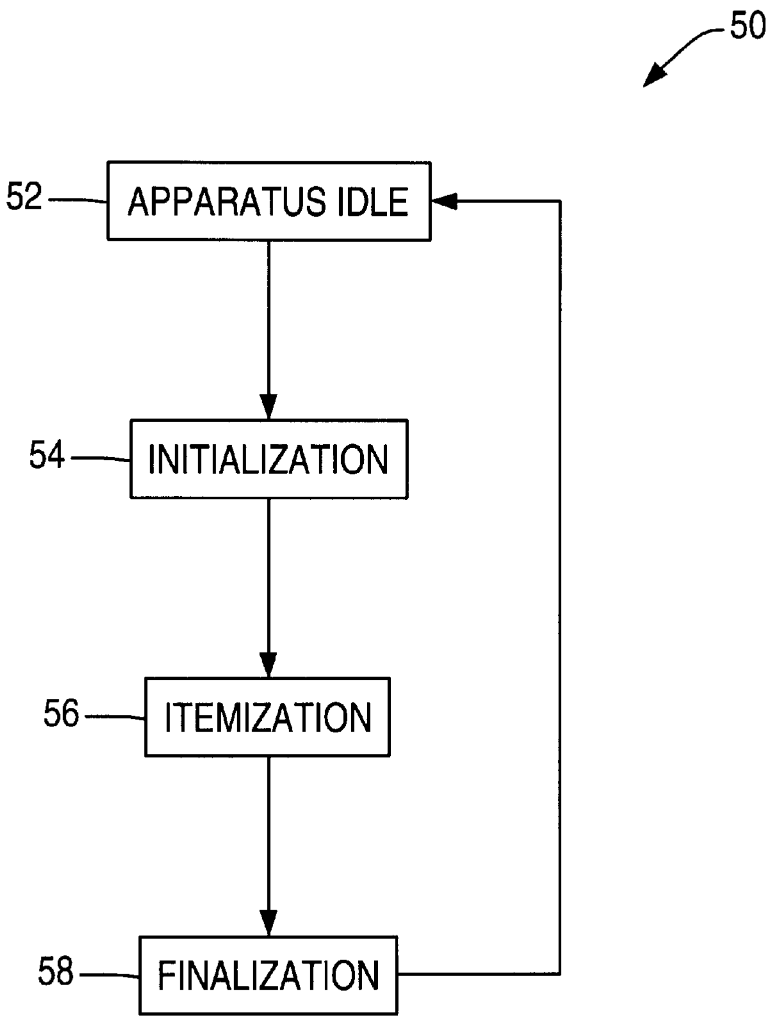
FIG. 3 is a flowchart setting forth a general procedure for checking out items through the self-service checkout terminal of FIG. 1.

Referring now to FIG. 3, there is shown a flowchart which sets forth a general procedure 50 for checking out items through the self-service checkout terminal 10. It should be appreciated that when the customer arrives at the self-service checkout terminal 10, the terminal 10 is in an idle state (step 52). An initialization step 54 is executed prior to checking out items for purchase. In particular, one or more initialization instructions are displayed on the display monitor 32 which instruct the customer to (1) touch a particular area of the touch screen of the display monitor 32 or push a particular button on the keypad 34 in order to select a desired method of payment, and/or (2) identify himself or herself by inserting a loyalty card, debit card, credit card, or smart card into the card reader 30.

At the completion of the initialization step 54, the routine 50 advances to an itemization step 56 where the customer enters individual items for purchase by scanning the items across the scanner 14. Moreover, in step 56 the customer enters items, such as produce items or the like, by weighing the items with the product scale 12, and thereafter entering a product lookup code associated with the item via either the keypad 34 or by touching a particular area of the touch screen of the display monitor 32. Further, in step 56 the customer may enter an item by manually entering the product identification code associated with the item via use of the keypad 34 or the touch screen of the display monitor 32. Such manual entry of an item may be necessary for items which would otherwise be entered via the scanner 14 if the bar code printed on the item is not readable by the scanner 14. Moreover, during step 56 it may be necessary to manually enter product information associated with an item (e.g. the price of the item) that was entered in one of the above-described manners if the master product database 48 is devoid of such product information.

It should be appreciated that the self-service checkout terminal 10 may be configured such that the routine 50 allows experienced customers of the self-service checkout terminal 10 to bypass the initialization step 52 thereby advancing directly to the itemization step 56. In such a configuration, the experienced customer would begin the transaction by scanning or otherwise entering his or her first item for purchase.

At the completion of the itemization step 56, the routine 50 advances to a finalization step 58 in which (1) a grocery receipt is printed by the printer 36, and (2) payment is tendered by either inserting currency into a cash acceptor (not shown), charging a credit card or debit card account, or decreasing a value amount stored on a smart card via the card reader 30. It should be appreciated that in the case of when a customer inserts currency into the cash acceptor, the self-service checkout terminal 10 may provide change via a currency dispenser (not shown) and a coin dispenser (not shown). After completion of the finalization step 58, the routine 50 returns to step 52 in which the self-service checkout terminal 10 remains in the idle condition until a subsequent customer initiates a checkout procedure.

Figure 4A:
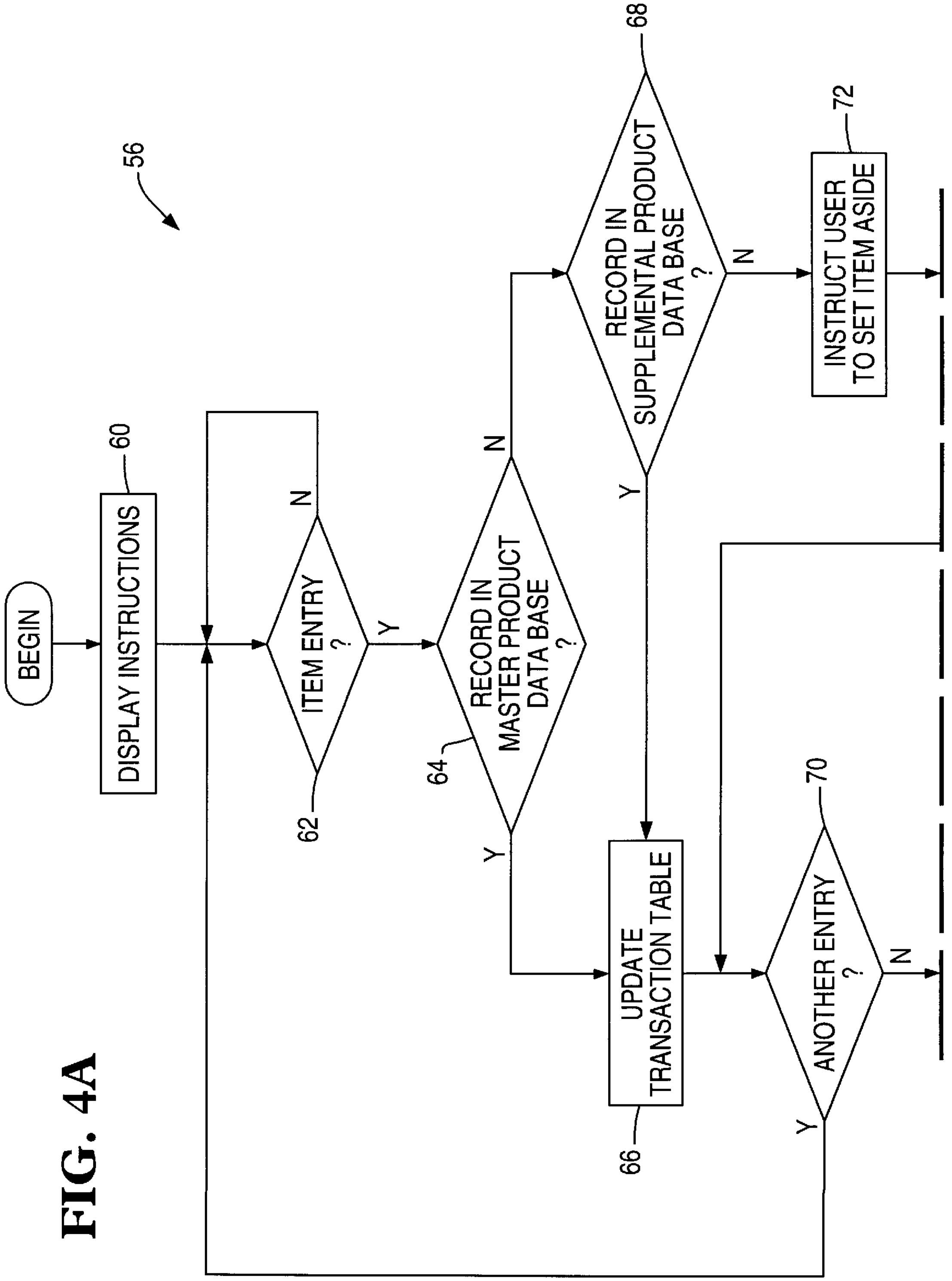
FIG. 4 is a flowchart setting forth in more detail the itemization step of the general procedure of FIG. 3.
Figure 4B:
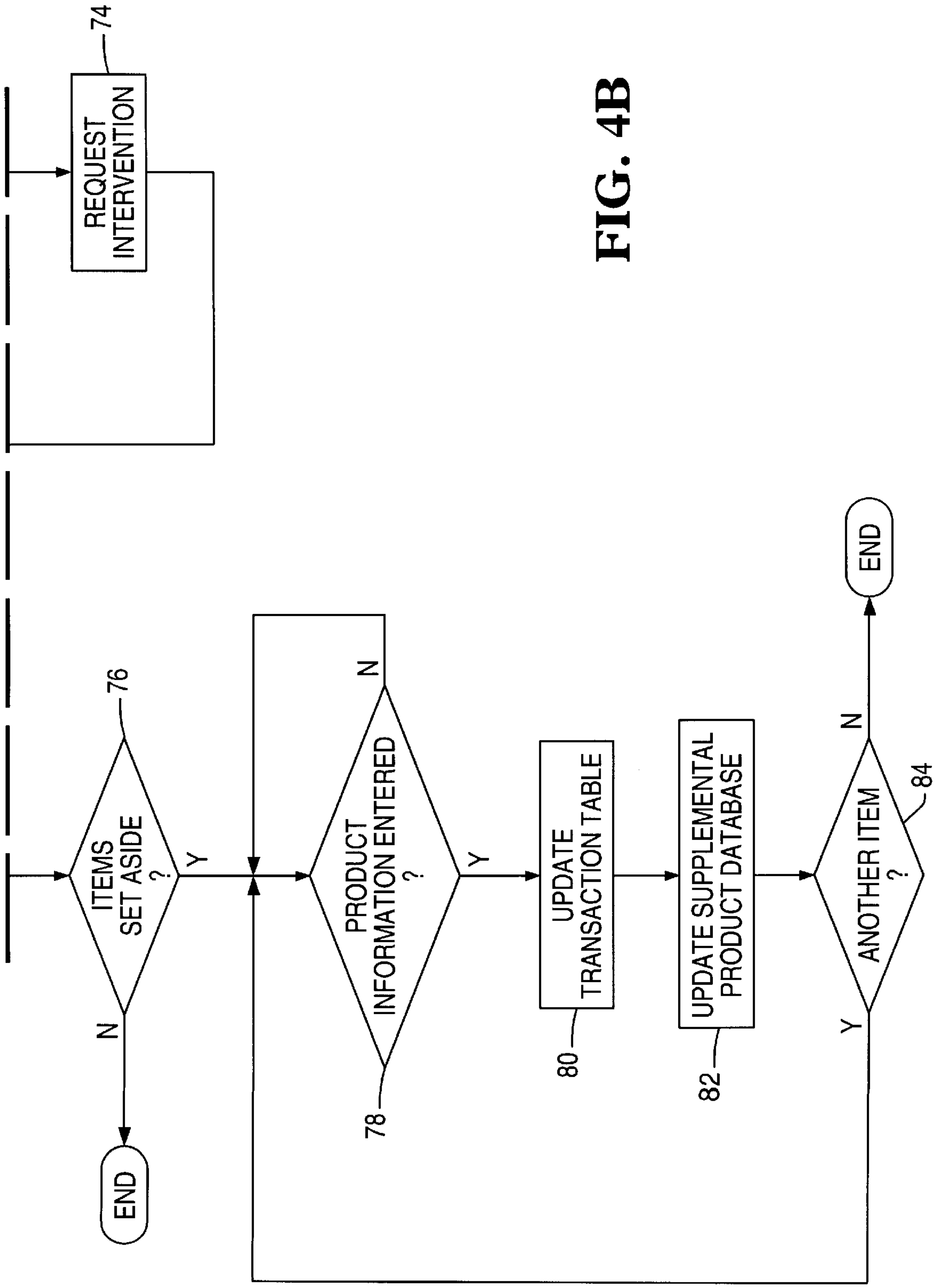

Referring now to FIG. 4, there is shown a flowchart setting forth the itemization step 56 in greater detail. After the initialization step 54 (see FIG. 3) is completed, the routine 56 advances to step 60 in which a message is displayed on the display monitor 32 which instructs the customer to enter an item by either (1) passing or otherwise scanning individual items across or adjacent the scanner 14 with the bar code containing the item's product identification code facing the scanning windows 14*a*, 14*b*, or (2) placing an individual item on the product scale 12 in order to be weighed, or (3) manually entering the product identification code associated with an item with the keypad 34 or the touch screen associated with the display monitor 32, or any combination thereof. The routine 56 then advances to step 62.

In step 62, the processing unit 26 determines whether an item has been entered into the self-service checkout terminal 10. In particular, the processing unit 26 determines if (1) the scanner 14 has successfully read or otherwise captured the product identification code associated with an item, (2) the product identification code associated with an item has been entered via the touch screen portion of the display monitor 32, or (3) the product identification code associated with an item has been entered via the keypad 34. More specifically, the scanner 14 generates an output signal which is sent to the processing unit 26 once the scanner 14 successfully reads the product identification code associated with the item. Similarly, the display monitor 32 and the keypad 34 generate an output signal which is sent to the processing unit 26 once the product identification code has been entered by the customer. If an item is successfully entered into the self-service checkout terminal 10, an item-entered control signal is generated and the routine 56 advances to step 64. If an item is not successfully entered into the self-service checkout terminal 10, the item-entered control signal is not generated, and the routine 56 loops back to monitor subsequent entry of an item.

In step 64, the processing unit 26 determines if the master product database 48 includes a record containing product information corresponding to the entered item. In particular, the processing unit 26 communicates with the central server 16 in order to determine if the master product database 48 has stored therein a record that contains product information associated with the item that was entered in step 62. As discussed above, such product information is utilized to complete the customer's checkout procedure. If the master product database 48 includes a record containing product information corresponding to the entered item, a record-found control signal is generated and the routine 56 advances to step 66. If the master product database 48 is devoid of a record containing product information corresponding to the entered item, a no-record control signal is generated, and the routine 56 advances to step 68.

In step 66, the processing unit 26 adds a record of the item entered in step 62 to the transaction table stored in the memory device 53. In particular, the processing unit 26 generates a control signal which causes the transaction table stored in the memory device 53 to be updated to include both the product identification code and the product information associated with the entered item. It should be appreciated that the contents of the transaction table are used by the self-service checkout terminal 10 for purposes of generating a grocery bill and receipt at the end of the checkout procedure. The routine 56 then advances to step 70.

In step 70, the processing unit 26 monitors output from the keypad 34 and the display monitor 32 in order to determine whether there are more items to be entered. In particular, a message is displayed on the display monitor 32 instructing the customer to touch a particular touch screen area of the display monitor 32, or to touch a particular key associated with the keypad 34, when the customer has completed entering all of his or her items for purchase.

If a particular output is detected from either the keypad 34 or the display monitor 32, the processing unit 26 determines that the itemization step 56 is complete and the routine 56 advances to step 76 in order to determine if product information associated with a number of items needs to be manually entered (as discussed below in more detail). If a particular output is not detected from either the keypad 34 or the display monitor 32, the processing unit 26 determines that the customer has additional items for purchase to be entered, and the routine 56 loops back to step 62 to monitor entry of subsequent items.

Returning now to step 64, if the master product database 48 is devoid of a record containing product information corresponding to the item entered in step 62, the routine 56 advances to step 68. In step 68, the processing unit 26 determines if the supplemental product database 46 includes a record containing product information corresponding to the entered item. In particular, the processing unit 26 communicates with the central server 16 in order to determine if the supplemental product database 46 has stored therein a record that includes product information associated with the item that was entered in step 62. As discussed above, the supplemental product database 46 contains product information associated with items which do not have records corresponding thereto stored in the master product database 48. If the supplemental product database 46 includes a record containing product information corresponding to the item entered in step 62, a record-found control signal is generated and the routine 56 advances to step 66 to update the transaction table so as to add a record corresponding to the item entered in step 62 (including product information retrieved from the supplemental database 46) in the manner previously discussed. If the supplemental product database 46 is devoid of a record containing product information corresponding to the item entered in step 62, a no-record control signal is generated, and the routine 56 advances to step 72.

In step 72, since both the master product database 48 and the supplemental product database 46 are devoid of product information associated with the item entered in step 62, the processing unit 26 generates a message which is displayed on the display monitor 32 which instructs the customer to set the item aside (e.g. place the item on the counter 42) such that product information associated with the item may be manually entered into the self-service checkout terminal 10 at the end of the itemization process. The routine 56 then advances to step 74.

In step 74, the processing unit 26 requests intervention from store personnel. In particular, the processing unit 26 communicates with the network 25 which pages or otherwise summons the retailer's personnel to intervene in the customer's transaction. Moreover, as alluded to above, the self-service checkout terminal 10 may request intervention via use of the status light device 11. The customer is then allowed to continue entry of his or her items for purchase, but the checkout procedure will not be completed until the intervention request is responded to by store personnel. The routine 56 then advances to step 70.

As discussed above, in step 70, the processing unit 26 monitors output from the keypad 34 and the display monitor 32 in order to determine whether there are more items to be entered. In particular, a message is displayed on the display monitor 32 instructing the customer to touch a particular touch screen area of the display monitor 32, or to touch a particular key associated with the keypad 34, when the customer has completed entering all of his or her items for purchase.

If a particular output is detected from either the keypad 34 or the display monitor 32, the processing unit 26 determines that the itemization step 56 is complete and the routine 56 advances to step 76 in order to determine if product information associated with a number of items needs to be manually entered. If a particular output is not detected from either the keypad 34 or the display monitor 32, the processing unit 26 determines that the customer has additional items for purchase to be entered, and the routine 56 loops back to step 62 to monitor entry of subsequent items.

In step 76, the processing unit 26 determines if any items have been set aside such that product information associated therewith may be manually entered into the self-service checkout terminal 10. In particular, as discussed above in regard to step 72, if both the master product database 48 and the supplemental product database 46 are devoid of product information associated with any item previously entered into the self-service checkout terminal 10, the customer is instructed to set such items aside (e.g. place such items on the counter 42). If the customer's items for purchase include items which have been set aside such that product information associated therewith may be manually entered into the self-service checkout terminal 10, the routine 56 advances to step 78. If the customer's items for purchase do not include items which have been set aside such that product information associated therewith may be manually entered into the self-service checkout terminal 10, the processing unit 26 determines that the itemization step 56 is complete and the routine 56 then ends thereby advancing the routine 50 (see FIG. 3) to the finalization step 58 in order to allow the customer to tender payment for his or her items for purchase.

In step 78, the processing unit 26 determines if product information associated with the set aside item has been manually entered into the self-service checkout terminal 10. In particular, the processing unit 26 monitors the data communication lines 49, 43 in order to determine if product information associated with the set aside item has been entered via the keypad 34 or the touch screen associated with the display monitor 32, respectively. As discussed in detail above, the retailer may configure the self-service checkout terminal 10 in a number of different manners in order to control manual entry of product information into the terminal 10. For example, the retailer may configure the self-service checkout terminal 10 such that only retail personnel (e.g. the customer service manager) may manually enter product information associated with the set aside item. Hence, in such a case, the customer service manager would respond to the intervention request (as generated in step 74), approach the terminal 10, "log on" to the terminal 10 via use of a password or the like, and thereafter manually enter the required product information associated with the item (e.g. the price of the item) via use of the keypad 34 or the touch screen associated with the display monitor 32. Alternatively, the retailer may configure the self-service checkout terminal 10 such that the customer himself or herself may manually enter such required product information if the customer is trained or otherwise skilled in such an operation.

Hence, in step 78, if the processing unit 26 determines that the required product information associated with the set aside item (e.g. the price of the set aside item) has been manually entered into the self-service checkout terminal 10, a manually-entered control signal is generated, and the routine 56 advances to step 80. If the processing unit 26 determines that such required product information has not been manually entered into the self-service checkout terminal 10, the routine 56 loops back in order to monitor manual entry of the required product information.

In step 80, the processing unit 26 adds a record of the set aside item to the transaction table stored in the memory device 53. In particular, the processing unit 26 generates a control signal which causes the transaction table stored in the memory device 53 to be updated to include both the product identification code and the manually entered product information associated with the set aside item. As discussed above, it should be appreciated that the contents of the transaction table are used by the self-service checkout terminal 10 for purposes of generating a grocery bill and receipt at the end of the checkout procedure. The routine 56 then advances to step 82.

In step 82, the processing unit 26 adds a record of the set aside item to the supplemental product database 46. In particular, the processing unit 26 generates an output signal which causes the central server 16 to update the supplemental product database 46 so as to include a record containing both the product identification code and the manually entered product information associated with the set aside item. As discussed above, the retailer may configure the self-service checkout terminal 10 in a number of different manners in order to control the addition of records to the supplemental product database 46. For example, the retailer may allow records to be added to the supplemental product database 46 only if the product information contained in the record (e.g. the price of the item) is manually entered by retail personnel such as the customer service manager.

Moreover, in the case of where the retailer configures the self-service checkout terminal 10 to allow the customer to manually enter the product information himself or herself without the aid of the customer service manager, the retailer may choose to approve the manually entered product information entered by the customer prior to adding a record corresponding thereto to the supplemental product database 46. In particular, when the customer manually enters product information associated with an item, a message containing such manually entered product information is sent via the network 25 to retail personnel located in the store office or the like. Retail personnel may then approve or deny the addition of a record containing the manually entered product information to the supplemental product database 46.

Once the supplemental product database 46 has been updated, the routine 56 advances to step 84. In step 84, the processing unit 26 determines whether there are more set aside items that require product information associated therewith to be manually entered. In particular, the processing unit 26 determines if product information has been manually entered for each of the items which do not have product information associated therewith stored in either the master product database 48 or the supplemental product database 46. If product information has been manually entered for each of such items, the processing unit 26 determines that the itemization step 56 is complete and the routine 56 then ends thereby advancing the routine 50 (see FIG. 3) to the finalization step 58 in order to allow the customer to tender payment for his or her items for purchase. If additional set aside items remain which require manual entry of required product information, the routine 56 loops back to step 78 in order to monitor subsequent manual entry of required product information.

While the invention has been illustrated and described in detail in the drawings and foregoing description, such an illustration and description is to be considered as exemplary and not restrictive in character, it being understood that only the preferred embodiment has been shown and described and that all changes and modifications that come within the spirit of the invention are desired to be protected.

What is claimed is:

1. A method of operating a retail checkout terminal, comprising the steps of:

determining a first product code associated with a first item when a user enters said first item into said checkout terminal;

determining if a master product database is devoid of first product information corresponding to said first item and generating a first no-record control signal in response thereto;

detecting if said user manually enters said first product information corresponding to said first item in response to generation of said first no-record control signal and generating a first manually-entered control signal in response thereto; and storing said first product information corresponding to said first item in a supplemental product database in response to generation of said first manually-entered control signal.

2. The method of claim 1, further comprising the step of entering a first record corresponding to said first item in a transaction table in response to generation of said first manually-entered control signal.

3. The method of claim 1, further comprising the step of generating a message which informs retail personnel that said first product information has been stored in said supplemental product database in response to said first product information storing step.

4. The method of claim 1, further comprising the steps of:

determining a second product code associated with a second item when said user enters said second item into said checkout terminal;

determining if said master product database is devoid of second product information corresponding to said second item and generating a second no-record control signal in response thereto;

determining if said supplemental product database is devoid of said second product information corresponding to said second item in response to generation of said second no-record control signal and generating a third no-record control signal in response thereto;

detecting if said user manually enters said second product information corresponding to said second item in response to generation of said third no-record control signal and generating a second manually-entered control signal in response thereto; and storing said second product information corresponding to said second item in said supplemental product database in response to generation of said second manually-entered control signal.

5. The method of claim 4, further comprising the step of entering a record corresponding to said second item in a transaction table in response to generation of said second manually-entered control signal.

6. The method of claim 4, further comprising the step of generating a message which informs retail personnel that said second product information has been stored in said supplemental product database in response to said second product information storing step.

7. The method of claim 1, further comprising the steps of:

determining a second product code associated with a second item when said user enters said second item into said checkout terminal;

determining if said master product database is devoid of second product information corresponding to said second item and generating a second no-record control signal in response thereto; and determining if said supplemental product database includes said second product information corresponding to said second item in response to generation of said second no-record control signal and generating a record-found control signal in response thereto.

8. The method of claim 7, further comprising the step of entering a record corresponding to said second item in a transaction table in response to generation of said record-found control signal.

9. A retail checkout terminal, comprising:

an input device for receiving a first product code associated with a first item when a user enters said first item into said checkout terminal;

a processing unit electrically coupled to said input device; and a memory device electrically coupled to said processing unit, wherein said memory device has stored therein a plurality of instructions which, when executed by said processing unit, causes said processing unit to:

(i) determine if a master product database is devoid of first product information corresponding to said first item and generate a first no-record control signal in response thereto, (ii) detect if said user manually enters said first product information corresponding to said first item in response to generation of said first no-record control signal and generate a first manually-entered control signal in response thereto, and (iii) store said first product information corresponding to said first item in a supplemental product database in response to generation of said first manually-entered control signal.

10. The retail checkout terminal of claim 9, wherein said plurality of instructions, when executed by said processing unit, further causes said processing unit to enter a record corresponding to said first item in a transaction table in response to generation of said first manually-entered control signal.

11. The retail checkout terminal of claim 9, wherein said plurality of instructions, when executed by said processing unit, further causes said processing unit to generate a message which informs retail personnel that said first product information has been stored in said supplemental product database.

12. The retail checkout terminal of claim 9, wherein said plurality of instructions, when executed by said processing unit, further causes said processing unit to:

(i) determine a second product code associated with a second item when said user enters said second item into said checkout terminal, (ii) determine if said master product database is devoid of second product information corresponding to said second item and generate a second no-record control signal in response thereto, (iii) determine if said supplemental product database is devoid of said second product information corresponding to said second item in response to generation of said second no-record control signal and generate a third no-record control signal in response thereto, (iv) detect if said user manually enters said second product information corresponding to said second item in response to generation of said third no-record control signal and generate a second manually-entered control signal in response thereto, and (v) store said second product information corresponding to said second item in a supplemental product database in response to generation of said second manually-entered control signal.

13. The retail checkout terminal of claim 12, wherein said plurality of instructions, when executed by said processing unit, further causes said processing unit to enter a record corresponding to said second item in a transaction table in response to generation of said second manually-entered control signal.

14. The retail checkout terminal of claim 12, wherein said plurality of instructions, when executed by said processing unit, further causes said processing unit to generate a message which informs retail personnel that said second product information has been stored in said supplemental product database.

15. The retail checkout terminal of claim 9, wherein said plurality of instructions, when executed by said processing unit, further causes said processing unit to:

(i) determine a second product code associated with a second item when said user enters said second item into said checkout terminal, (ii) determine if said master product database is devoid of second product information corresponding to said second item and generate a second no-record control signal in response thereto, and (iii) determine if said supplemental product database includes said second product information corresponding to said second item in response to generation of said second no-record control signal and generate a record-found control signal in response thereto.

16. The retail checkout terminal of claim 15, wherein said plurality of instructions, when executed by said processing unit, further causes said processing unit to enter a record corresponding to said second item in a transaction table in response to generation of said record-found control signal.

* * * * *